US012104142B2

(12) United States Patent
Bull et al.

(10) Patent No.: US 12,104,142 B2
(45) **Date of Patent: *Oct. 1, 2024**

(54) POLYMER BLEND TO STABILIZE HIGHLY ALKALINE LAUNDRY DETERGENT

(71) Applicant: ECOLAB USA INC., Saint Paul, MN (US)

(72) Inventors: Jessica Bull, Saint Paul, MN (US); David Dotzauer, Saint Paul, MN (US); Thomas Duerrschmidt, Monheim am Rhein (DE); Gregory Scott Conrad, Saint Paul, MN (US); Alyssa Ana Hantzsch, Saint Paul, MN (US); Kelsey West, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/452,142

(22) Filed: Aug. 18, 2023

(65) Prior Publication Data

US 2023/0392097 A1 Dec. 7, 2023

Related U.S. Application Data

(63) Continuation of application No. 17/646,831, filed on Jan. 3, 2022, now Pat. No. 11,773,349, which is a continuation of application No. 16/749,267, filed on Jan. 22, 2020, now Pat. No. 11,248,192.

(60) Provisional application No. 62/795,138, filed on Jan. 22, 2019.

(51) Int. Cl.

| | |
|---|---|
| ***C11D 3/37*** | (2006.01) |
| ***C11D 1/66*** | (2006.01) |
| ***C11D 17/00*** | (2006.01) |

(52) U.S. Cl.

CPC ............ *C11D 3/3765* (2013.01); *C11D 1/662* (2013.01); *C11D 3/3792* (2013.01); *C11D 17/0008* (2013.01)

(58) Field of Classification Search

CPC ..... C11D 3/3765; C11D 3/3792; C11D 1/662; C11D 17/0008

See application file for complete search history.

(56) References Cited

U.S. PATENT DOCUMENTS

| | | | |
|---|---|---|---|
| 4,826,618 A | 5/1989 | Borseth et al. | |
| 5,880,083 A | 3/1999 | Beaujean et al. | |
| 6,194,371 B1 | 2/2001 | Donovan et al. | |
| 6,482,792 B2 | 11/2002 | Ip | |
| 8,062,381 B2 | 11/2011 | Shamayeli et al. | |
| 8,278,259 B2 | 10/2012 | Shamayeli et al. | |
| 9,752,109 B2 | 9/2017 | Dürrschmidt et al. | |
| 11,248,192 B2 * | 2/2022 | Bull | C11D 1/662 |
| 11,773,349 B2 * | 10/2023 | Bull | C11D 3/3715 8/137 |
| 2010/0251486 A1 | 10/2010 | Yu et al. | |
| 2014/0178324 A1 | 6/2014 | Martinez-Castro et al. | |
| 2015/0232791 A1 * | 8/2015 | Droege | C11D 17/003 510/349 |
| 2017/0369818 A1 | 12/2017 | Park et al. | |

FOREIGN PATENT DOCUMENTS

| | | | |
|---|---|---|---|
| EP | 0120533 A2 | 10/1984 | |
| EP | 01205336 A2 | 10/1984 | |
| EP | 0414285 B1 | 2/1991 | |
| EP | 0953631 B1 | 11/1999 | |
| EP | 0958342 B1 | 11/1999 | |
| EP | 1991650 B1 | 11/2008 | |
| EP | 2183346 B1 | 5/2010 | |
| EP | 2865741 A1 | 4/2015 | |
| EP | 2379689 B1 | 4/2018 | |
| WO | 9829526 A1 | 7/1998 | |
| WO | 2004041990 A1 | 5/2004 | |
| WO | 2004065535 A1 | 8/2004 | |
| WO | 2007101470 A1 | 9/2007 | |
| WO | 2014154244 A1 | 10/2014 | |
| WO | 2015065805 A1 | 5/2015 | |
| WO | WO2015/121134 * | 8/2015 | C12N 9/14 |
| WO | 2016081132 A1 | 5/2016 | |
| WO | 2016106167 A1 | 6/2016 | |
| WO | 2017102866 A1 | 6/2017 | |
| WO | 2017102868 A1 | 6/2017 | |
| WO | 2017202922 A1 | 11/2017 | |
| WO | 2017202923 A1 | 11/2017 | |

OTHER PUBLICATIONS

International Searching Authority in connection with PCT/US2020/014519 filed Jan. 22, 2020, "The International Search Report and the Written Opinion of the International Searching Authority, or the Declaration", 12 pages, mailed Jul. 16, 2020.

Rohm and Haas, "The Ingredients of Creativity", Acusol Theology Modifiers for Home and Fabric Care Products, 20 pages, May 2008.

* cited by examiner

*Primary Examiner* — Amina S Khan

(74) *Attorney, Agent, or Firm* — McKee, Voorhees & Sease, PLC

(57) ABSTRACT

Liquid detergent compositions with polymer blends to provide a stable aqueous use solution of a highly alkaline detergent composition are provided. The liquid detergent composition include concentrates and use solutions with blends of alkali-swellable polymers (ASE) and hydrophobically-modified alkali-swellable polymers (HASE). Methods for washing textiles using the liquid detergent compositions are also provided.

13 Claims, 1 Drawing Sheet

POLYMER BLEND TO STABILIZE HIGHLY ALKALINE LAUNDRY DETERGENT

CROSS-REFERENCE TO RELATED APPLICATIONS

This is a continuation application of U.S. Ser. No. 17/646,831, filed Jan. 3, 2022, now U.S. Pat. No. 11,773,349, which is a continuation application of U.S. Ser. No. 16/749,267, filed Jan. 22, 2020, now U.S. Pat. No. 11,248,192, which claims priority under 35 U.S.C. § 119 to Provisional Application U.S. Ser. No. 62/795,138, filed Jan. 22, 2019.

FIELD OF THE INVENTION

The invention relates to a liquid detergent compositions with polymer blends to provide a stable aqueous use solution of a highly alkaline detergent composition. The liquid detergent composition can be provided as a concentrate or as a use solution and include blends of alkali-swellable polymers (ASE) and hydrophobically-modified alkali-swellable polymers (HASE). The liquid detergent composition is in the form of the concentrate or the use solution is an emulsion of the type water-in-oil emulsion or oil-in-water emulsion dependent on the amounts of water and oil in the emulsion that does not require homogenizers, premixes and/or milling steps to produce. Methods for washing textiles using the non-milled liquid detergent compositions are also provided.

BACKGROUND OF THE INVENTION

Various liquid detergents are commercially-available and known in the art. Such detergents are, for example, described in U.S. Pat. Nos. 9,752,109, 5,880,083, WO 2004/065535, and WO 2004/041990. The formulation of alkaline liquid detergents requires both washing performance (i.e. removing dirt and soils without damaging the fabrics, imparting a pleasant softness, and reducing electrostatic charges between textiles) and stable emulsions. In particular it is needed for formulations to be sufficiently viscous and stable on storage, so that even under temperature stress over several months, neither the viscosity collapses nor phase separation occurs.

Various liquid detergent formulations use solubilizers to maintain stable emulsions. For example, WO 2007/101470 describes a liquid detergent composition including non-ionic linear alkoxylated alcohols to provide storage-stable and efficacious washing performance. These liquid detergent compositions contain solubilizers which are able to keep the components in solution and the resulting emulsion stable even over a longer storage time. This was achieved by the use of one or more cross-linked or partly cross-linked polyacrylic acids and/or polymethacrylic acids in the composition. These substances are used as thickeners and stabilizers for a liquid detergent concentrate composition which represents an emulsion. These acrylic acid or methacrylic acid polymers may be cross-linked or partly cross-linked with a polyalkenyl polyether compound as crosslinker.

However, there are drawbacks to the use of such cross-linked or partly cross-linked polyacrylic acid/polymethacrylic acid thickeners and stabilizers into emulsions. The production process of the emulsions of the state of art requires the use of a premix to introduce the thickening polymer, i.e. the solid cross-linked or partly cross-linked polyacrylic acid/polymethacrylic acid, into the formula. This premix is both expensive and time-consuming due to the nature of the addition, which also involves adding a powder polymer to a liquid surfactant. This may also require use of a powder educator. After the premix is added to the rest of the emulsion, a milling or homogenization step is required. This process requires high energy consumption and costly machinery required to produce a stable concentrate detergent composition.

It is therefore an object of this disclosure to provide a stabilized liquid detergent composition that is an emulsion that replaces such conventional stabilizing systems.

It is a further object of the disclosure to provide stable emulsions which do not or only slightly undergo phase separation during storage or when exposed to highly different temperature ranges.

It is another object of this disclosure to provide the stabilizing systems for formulations containing high levels of surfactants and alkalinity.

It is another object of this disclosure to eliminate the need for premixes, homogenizers and milling processes for laundry emulsion detergents.

It is another object of this disclosure to formulate laundry emulsion detergents that can be made by batch mixing processes.

Other objects, aspects and advantages of this invention will be apparent to one skilled in the art in view of the following disclosure, the drawings, and the appended claims.

SUMMARY OF THE INVENTION

An advantage of the liquid detergent compositions and methods of using the same are that desired performance characteristics are achieved in combination with stability, including stable emulsions which do not or only slightly undergo phase separation during storage or when exposed to highly different temperature ranges. Beneficially, the stable emulsions do not require premixes, homogenizers and milling processes for production thereof. Instead the stabilized detergent compositions can be made by batch mixing processes. In this disclosure, batch mixing is any mixing operation in which all ingredients are loaded into the mixing vessel in a specified sequence, and mixed for a duration of time until a homogeneous mixture is produced and discharged from the mixing vessel in a single lot before a subsequent batch is introduced.

In an embodiment, a liquid detergent composition comprises: between about 1 wt-% and about 50 wt-% alkalinity; between about 1 wt-% and about 10 wt-% rheology modifiers comprising at least one alkali-swellable polymer (ASE) and at least one hydrophobically-modified alkali-swellable polymer (HASE), wherein the ASE rheology modifier has a molecular weight between about 20,000 to about 300,000 g/mol, and wherein the HASE rheology modifier has a molecular weight between about 50,000 to about 500,000 g/mol, and wherein the ratio of the HASE rheology modifier to the ASE rheology modifier is from about 0.5:1 to about 10:1; between about 1 wt-% to about 50 wt-% nonionic surfactant(s); between about 10 wt-% to about 80 wt-% water; and optionally at least one of chelant/sequestrant/builder. In a further embodiment, the ratio of the HASE rheology modifier to the ASE rheology modifier is from about 0.5:1 to about 5:1, and the rheology modifiers are included at an actives level between about 0.5% to about 5%.

In embodiments, the HASE polymer has the following formula:

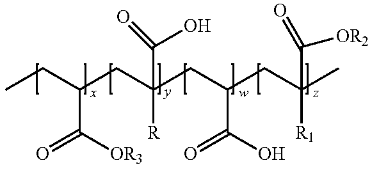

wherein R is a hydrogen or C1-C6 alkyl group;

wherein R1 is a hydrogen or C1-C6 alkyl group;

wherein R2 is a hydrophobic alkyl group in the range from C4-C24;

wherein R3 can be any one of a hydrogen or C1-C6 alkyl group;

wherein the ratio of x:y is from about 1:20 to about 20:1;

wherein the ratio of x:w is from about 1:20 to about 20:1; and wherein the ratio of x:z is from about 1:1 to about 500:1.

In further embodiments, the ASE polymer has the following formula:

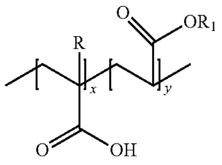

wherein R and/or R1 is a hydrogen, CH3 or a C1 to C6 alkyl chain; and wherein the ratio of x:y is from 1:10 to 10:1.

In still further embodiments, the rheology modifier further comprises a nonionic alkyl polyglycoside surfactant, the alkalinity is an alkali metal hydroxide, the chelant/sequestrant/builder comprises an aminocarboxylate and/or polycarboxylate polymer, and the nonionic surfactants are alkoxylated surfactants, and wherein one of the nonionic surfactants is a linear or branched alcohol containing 8 to 18 carbon atoms, and 7 to 20 ethylene oxide groups. In still further embodiments, the alkalinity comprises between about 1 wt-% and about 50 wt-%, the rheology modifiers comprise between about 1 wt-% and about 7 wt-%, the water comprises between about 10 wt-% to about 50 wt-%, the chelant/sequestrant comprises between about 0 wt-% to about 10 wt-%, and the nonionic surfactant comprises between about 10 wt-% to about 50 wt-% of the detergent composition. A hydrotrope can further be included to provide a viscosity of the composition between about 500 to about 2500 cPs. Moreover, the composition can be in a concentrated form that may be diluted to a use cleaning concentration, and the liquid composition can beneficially be a stable, opaque emulsion, wherein the liquid composition is stable for at least 6 months at ambient temperatures, and wherein stability is measured according to phase separation of less than 5%.

In additional embodiments, the liquid detergent composition comprises: between about 1 wt-% and about 50 wt-% alkalinity; between about 1 wt-% and about 10 wt-% rheology modifiers comprising at least one alkali-swellable polymer (ASE), at least one hydrophobically-modified alkali-swellable polymer (HASE), and at least one nonionic alkyl polyglycoside surfactant, wherein the ASE rheology modifier has a molecular weight between about 20,000 to about 300,000 g/mol, and wherein the HASE rheology modifier has a molecular weight between about 50,000 to about 500,000 g/mol, and wherein the ratio of the HASE rheology modifier to the ASE rheology modifier is from about 0.5:1 to about 5:1; between about 1 wt-% to about 50 wt-% nonionic surfactant(s); between about 10 wt-% to about 80 wt-% water; and optionally at least one of chelant, sequestrant, builder and/or hydrotrope; wherein the composition has a viscosity between about 500 to about 2500 cPs.

In additional embodiments, liquid detergent compositions are produced by the process of mixing the components in a batch process. In embodiments, the process does not include a premix and/or homogenizer for the formulation.

In further embodiments, a method of washing textiles comprises: providing the liquid detergent compositions described according to embodiments herein; and washing the textiles in an institutional or a household washing machine. In embodiments, the methods further comprise (a) diluting the liquid detergent composition at a point of use with water; and/or adding a bleaching composition to the liquid detergent composition or to diluted use composition.

In further embodiments, a method of dispensing a liquid detergent composition for washing textiles comprises: dispensing the liquid detergent compositions described according to embodiments herein into a washing machine, wherein the washing machine is an institutional or a household washing machine.

While multiple embodiments are disclosed, still other embodiments will become apparent to those skilled in the art from the following detailed description, which shows and describes illustrative embodiments. Accordingly, the drawings and detailed description are to be regarded as illustrative in nature and not restrictive.

Figure 1:
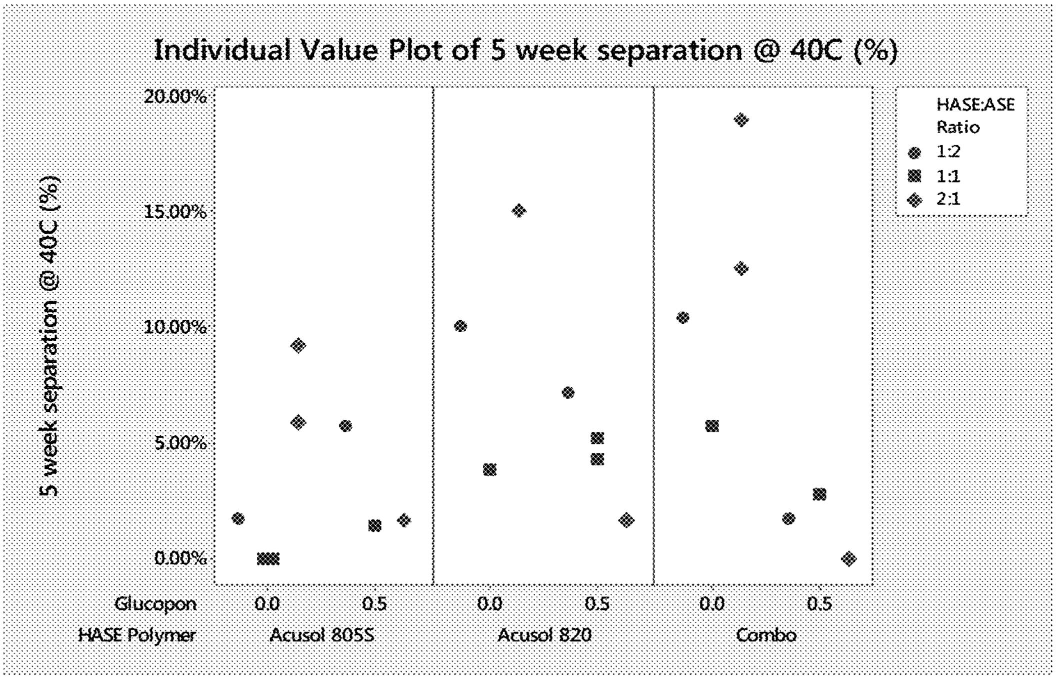
FIGS. 1-2 show results of testing HASE and ASE polymers in combination and alone with and without a nonionic alkyl polyglycoside surfactant on the percentage of phase separation of the emulsions at 5 weeks at 40° C. according to formulation embodiments disclosed herein.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE INVENTION

The embodiments are not limited to particular methods of making and/or formulations for stabilized detergent compositions, namely alkaline laundry detergents, which can vary and are understood by skilled artisans. It has been surprisingly found that a blend of alkali-swellable polymers (ASE) and hydrophobic ally-modified alkali-swellable polymers (HASE) provide stable emulsion detergent compositions without the need for premixes, homogenizers and milling processes for production thereof, providing beneficial detergent compositions for applications of use including fabric and textile laundering. In a further aspect, embodiments of the stable emulsion detergent compositions beneficially are free of cross-linked or partly cross-linked polyacrylic acids and/or polymethacrylic acids.

It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers within the defined range. Throughout this disclosure, various aspects are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments without undue experimentation, but the preferred materials and methods are described herein. In describing and claiming the embodiments, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "surfactant" or "surface active agent" refers to an organic chemical that when added to a liquid changes the properties of that liquid at a surface.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions may comprise, consist essentially of, or consist of the components and ingredients as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Detergent Compositions

According to embodiments, the detergent compositions include highly alkaline and high surfactant concentration with a stabilizing blend of rheology modifiers, namely a blend of alkali-swellable polymers (ASE) and hydrophobically-modified alkali-swellable polymers (HASE). The alkaline detergent compositions can include additional functional ingredients and can be provided as concentrate or use compositions. In embodiments, the detergent compositions do not require and/or employ cationic surfactants for stabilizing the emulsion compositions due to the stabilizing blend of rheology modifiers. Exemplary detergent compositions are shown in Table 1 in weight percentage.

TABLE 1

| Material | First Exemplary Range wt.-% | Second Exemplary Range wt.-% | Third Exemplary Range wt.-% |
|---|---|---|---|
| Alkalinity source | 1-70 | 1-50 | 10-50 |
| HASE/ASE Rheology Modifiers | 0.1-10 | 0.5-10 | 1-7 |
| Surfactant(s) | 1-70 | 1-50 | 10-50 |
| Chelant(s)/ Sequestrant(s) | 0-25 | 0.1-10 | 1-10 |
| Water | 10-80 | 20-70 | 30-60 |
| Additional Functional Ingredients | 0-90 | 0-75 | 0-50 |

The liquid detergent compositions have a viscosity range of between about 500 and 2500 cPS, preferably between about 500 and 2000 cPS, preferably between about 1000 and 2000 cPS, or more preferably between about 700 and 1500 cPS (measured at 50 revolutions per minute (RPM) on a Brookfield RVT viscosimeter with spindle #3 at an ambient temperature or 25° C.). Beneficially, the viscosity allows the liquid detergent concentrate to be dispensed by pouring and/or various pumping devices and it is not necessary to use modified pumping devices for high-viscous liquids.

The detergent compositions are opaque, highly viscous dispersions. The detergent compositions may include concentrate compositions or may be diluted to form use compositions. In general, a concentrate refers to a composition that is intended to be diluted with water to provide a use solution that contacts an object to provide the desired cleaning.

Beneficially, the detergent compositions are stable, flowable emulsions which do not undergo phase separation during storage or when exposed to highly different temperature ranges. In an aspect, the detergent compositions do not undergo phase separation at room temperature storage for a period of at least 6 months. In an aspect, the detergent compositions do not undergo phase separation at 40-50° C. and/or refrigeration between 2-10° C. storage for a period of at least 8 weeks (which is also illustrative of room temperature stability of 6 months). As referred to herein, a lack of phase separation is confirmed by less than 5%, preferably less than 4% separation of the detergent composition over the period of time and under defined temperature conditions.

Alkalinity Source

The liquid detergent composition comprises one or more alkalinity sources. The source of alkalinity can be any source of alkalinity that is compatible with the other components of the detergent composition. Exemplary sources of alkalinity include alkali metal hydroxides, alkali metal carbonates, alkali metal silicates, alkali metal salts, phosphates, amines, and mixtures thereof, preferably alkali metal hydroxides including sodium hydroxide, potassium hydroxide, and lithium hydroxide or mixtures thereof, and most preferred is sodium hydroxide and/or potassium hydroxide.

The liquid detergent composition can include a concentrate as well as a highly alkaline use solution because it contains high amounts of an alkalinity sources. The alkalinity source controls the pH of the resulting solution when water is added to the detergent composition to form a use solution. The pH of the use solution must be maintained in the alkaline range in order to provide sufficient detergency properties. Further, the pH of the use solution is also useful for an optimized reduction in the germs count, such as bacteria, fungi, virus and spores, of the laundry washed with the detergent composition. The pH of the use solution is between approximately 9 and approximately 14. Particularly, the pH of the use solution is between about 10 and about 14. More particularly, the pH of the use solution is between about 10 and about 13. In a particularly preferred embodiment, the pH of the use solution is from about 10.5 to about 12 and the pH of the concentrate is at least about 13 or greater.

Exemplary alkali metal hydroxides include sodium hydroxide, potassium hydroxide, and lithium hydroxide. However, most preferred is sodium hydroxide. The source of alkalinity, preferably an alkali metal hydroxide, can be included in a variety of forms, including for example in the form of solid beads, dissolved in an aqueous solution or a combination thereof. Alkali metal hydroxides are commercially available as pellets or beads having a mix of particle sizes, or as an aqueous solution, as for example, as about 45 wt.-%, about 50 wt.-% and about 73 wt.-% solution.

Exemplary alkali metal salts include sodium carbonate, trisodium phosphate, potassium carbonate, and mixtures thereof.

Exemplary phosphates include sodium pyrophosphate, potassium pyrophosphate, and mixtures thereof.

Exemplary amines include alkanolamine selected from the group comprising triethanolamine, monoethanolamine, diethanolamine, and mixtures thereof.

In some embodiments, the alkalinity source is included in the detergent composition at an amount of at least about 1 wt-% to about 70 wt-%, about 1 wt-% to about 60 wt-%, about 1 wt-% to about 50 wt-%, about 10 wt-% to about 50 wt-%, about 10 wt-% to about 40 wt-%, or about 20 wt-% to about 40 wt-%. In addition, without being limited according to the invention, all ranges recited are inclusive of the numbers defining the range and include each integer within the defined range.

Rheology Modifiers

The liquid detergent composition comprises a blend of at least two rheology modifiers. The rheology modifiers include a blend of alkali-swellable polymers (ASE) and hydrophobically-modified alkali-swellable polymers (HASE). The rheology modifiers preferably further includes an alkyl polyglycoside surfactant in addition to the ASE and HASE polymer rheology modifiers.

HASE may also be referred to as hydrophobically modified alkali-soluble emulsion polymers and are referred to herein synonymously. HASE polymers are synthesized from an acid/acrylate copolymer backbone and include an ethoxylated hydrophone made through emulsion polymerization. See Acusol Rheology Modifier Product Specification (May 2008), Rhom and Haas, which is hereby incorporated by reference in its entirety. Exemplary HASE polymer rheology modifiers have the following formula:

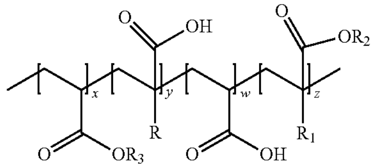

wherein R is a hydrogen or C1-C6 alkyl group; wherein R1 is a hydrogen or C1-C6 alkyl group; wherein R2 is a suitable hydrophobic alkyl group in the range from C4-C24, wherein the alkyl group can be alkoxylated, which can include ethoxylated, propoxylated or a combination thereof, and the alkoxylation can be to a degree between 1 and 60, more preferably between 10 and 50; and wherein R3 can be any one of a hydrogen or C1-C6 alkyl group. The repeating units comprising R, R1, R2, and R3 can be in any suitable order and can be randomly distributed.

Suitable HASE polymers can have a molecular weight in the range of about 50,000 to about 500,000 g/mol wherein the ratio of x:y is in the range from about 1:20 to about 20:1, the ratio of x:w is in the range from about 1:20 to about 20:1, and the ratio of x:z is in the range from about 1:1 to about 500:1. Examples of commercially-available HASE polymer rheology modifiers according to the above formula are sold under the tradename Acusol 801S, Acusol 805S, Acusol 820, and Acusol 823. Preferred HASE polymer rheology modifiers are sold under the tradename Acusol 805S and 820. In other embodiments, the HASE polymer rheology modifiers have a dynamic (absolute) viscosity range of between about 30 cPS and 500 cPS, preferably between about 40 cPS and 400 cPS, or more preferably between about 100 cPS and 300 cPS.

Additional HASE polymer rheology modifiers may include, for example, polymers sold under the tradename Rheomer (e.g. Rheomer 33T) commercially-available from Solvay, polymers sold under the tradename Novethix (e.g. Novethix L-10) commercially-available from Lubrizol, polymers sold under the tradename Rheovis (e.g. Rheovis AT-120) commercially-available from BASF, polymers sold under the tradename Optiflo HV-80 commercially-available from BYK, and polymers sold under the tradename Texicryl commercially-available from Scott Bader.

One or more HASE polymer rheology modifiers can be included in the detergent compositions. Beneficially, the HASE polymer rheology modifiers thicken through multiple mechanisms of action, including charge-induced polyelectrolytic chain expansion and association of the extended hydrophone groups. The HASE polymers can be added directly into the detergent formulations without preparation of a separate thickener solution (i.e. premix). The viscosity is developed by the inorganic bases or organic amines being anionically charged and water soluble; they dissolve and swell due to charge-charge repulsion and thicken instantly. When the polymers swell the pendant hydrophobic groups build associations in the formulation, such as with other polymers, surfactants, particulates, emulsion droplets and dyes. The HASE polymers thicken through this type of associative structures.

ASE may also be referred to as alkali soluble emulsion polymers and are referred to herein synonymously. ASE polymers are synthesized from acid and acrylate co-monomers and made through emulsion polymerization. Exemplary ASE polymer rheology modifiers have the following formula:

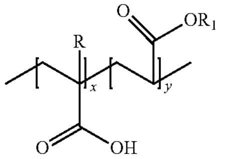

wherein R and/or R1 is a hydrogen, CH3 or any C1 to C6 alkyl chain. Suitable ASE polymers can have a molecular weight in the range of about 20,000 to about 300,000 g/mol, and wherein the ratio of x:y is in the range from 1:10 to 10:1. Examples of commercially-available ASE polymer rheology modifiers according to the above formula are sold under the tradename Acusol 810A, Acusol 830, Acusol 835, and Acusol 842. A preferred ASE polymer rheology modifier is sold under the tradename Acusol 830. In other embodiments, the ASE polymer rheology modifiers have a dynamic (absolute) viscosity range of between about 10 cPS and 600 cPS, preferably between about 100 cPS and 500 cPS, or more preferably between about 150 cPS and 450 cPS.

Additional ASE polymer rheology modifiers may include, for example, polymers sold under the tradename Rheovis (e.g. Rheovis AS-1125) commercially-available from BASF, and polymers sold under the tradename Texicryl commercially-available from Scott Bader.

One or more ASE polymer rheology modifiers can be included in the detergent compositions. Beneficially, the ASE polymer rheology modifiers can be added directly into the detergent formulations without preparation of a separate thickener solution (i.e. premix). The viscosity is developed by adjusting the pH with the alkalinity source as the polymers contain carboxylic groups that swell upon neutralization. Without being bound to a particular mechanism of action, the polymers thicken via a non-associative mechanism (i.e. do not interact with surfactant structures, particulates or insoluble emulsion droplets. The ASE polymers thicken through chain entanglement in the continuous phase.

In an aspect, the rheology modifiers include an alkyl polyglycoside surfactant. Suitable alkyl polyglycosides include, but are not limited to, alkyl polyglucosides. Alkyl polyglycosides are bio-based non-ionic surfactants which have thickening, wetting and detersive properties. Commercially available alkyl polyglycosides may contain a blend of carbon lengths. Exemplary alkyl polyglycosides include alkyl polyglycosides containing carbon chain lengths of less than C16. In one example, suitable alkyl polyglycosides include C8-C16 alkyl polyglycosides and alkyl polyglycosides blends primarily containing C8-C16 or C12-C16 alkyl polyglycosides. Suitable commercially available alkyl polyglucosides include Glucopon 625 UP available from BASF Corporation. In some embodiments, the alkyl polyglycosides surfactant is included in the detergent composition at an amount of at least about 0.01 wt-% to about 5 wt-%, about 0.1 wt-% to about 5 wt-%, about 0.1 wt-% to about 3 wt-%, about 0.1 wt-% to about 1 wt-%, about 0.1 wt-% to about 0.5 wt-%. In some embodiments, the rheology modifiers (combination of the HASE:ASE polymers and optionally the alkyl polyglycosides) are included in the detergent composition at an amount of at least about 0.01 wt-% to about 10 wt-%, about 0.1 wt-% to about 10 wt-%, about 0.5 wt-% to about 10 wt-%, about 1 wt-% to about 10 wt-%, about 1 wt-% to about 8 wt-%, about 1 wt-% to about 7 wt-%, or about 1 wt-% to about 6 wt-%. In addition, without being limited according to the invention, all ranges recited are inclusive of the numbers defining the range and include each integer within the defined range.

In some embodiments, the detergent compositions include an active amount of the rheology modifiers between about 0.5% to about 5%, between about 1% to about 3%, between about 1.4% to about 1.8%. In addition, without being limited according to the invention, all ranges recited are inclusive of the numbers defining the range and include each integer within the defined range.

In some embodiments, the ratio of the HASE rheology modifier to the ASE rheology modifier is from about 0.1:1 to about 10:1, preferably from about 0.5:1 to about 5:1, or between about 0.5:1 to about 2:1. In addition, without being limited according to the invention, all ranges recited are inclusive of the numbers defining the range and include each integer within the defined range. A preferred combination of polymer rheology modifiers include Acusol 805 and/or 820 and Acusol 830.

Nonionic Surfactants

The detergent compositions include at least one nonionic surfactant. Nonionic surfactants suitable for use with detergent compositions include synthetic or natural alcohols that are alkoxylated (with ethylene and/or propylene and/or butylenes oxide) to yield a variety of C6-C24 alcohol ethoxylates and/or propoxylates and/or butoxylates (preferably C6-C14 alcohol ethoxylates and/or propoxylates and/or butoxylates having 1 to 20 alkylene oxide groups (preferably 2 to 20 alkylene oxide groups); C6-C24 alkylphenol ethoxylates (preferably C8-C10 alkylphenol ethoxylates) having 1 to 100 ethylene oxide groups (preferably about 12 to about 20 ethylene oxide groups); and C6-C24 alkylpolyglycosides (preferably C6-C20 alkylpolyglycosides) having 1 to 20 glycoside groups (preferably 9 to 20 glycoside groups).

Suitable alkoxylated surfactants for use as surfactants include EO/PO block copolymers, such as the Pluronic and reverse Pluronic surfactants; alcohol alkoxylates, such as Dehypon LS-54 (R-(EO)5(PO)4); wherein R represents a linear or branched fatty alcohol residue) and Dehypon LS-36 (R-(EO)3(PO)6; wherein R represents a linear or branched fatty alcohol residue); and capped alcohol alkoxylates, such as Plurafac LF221 and Tegoten EC11; mixtures thereof, or the like. Additional surfactants include alkoxylated primary or secondary alcohol having from 6 to 24, preferably 6 to 22, more preferred 8 to 18 carbon atoms reacted with from 2 to 18 moles of ethylene, and/or propylene, and/or butylene oxide.

Additional suitable alkoxylated surfactants include near and secondary alcohol ethoxylates (fatty alcohol ethoxylates, e.g., tridecyl alcohol alkoxylate, ethylene oxide adduct), alkyl phenol ethoxylates, ethoxy/propoxy block surfactants, and the like. Examples of preferred linear and secondary alcohol ethoxylates (fatty alcohol ethoxylates, e.g., tridecyl alcohol alkoxylate, ethylene oxide adduct) include five mole ethoxylate of linear, primary 12-14 carbon number alcohol (C12-14H25-29)-O—(CH2CH$_2$O)5H (one of which is sold under the tradename LAE 24-5), seven mole ethoxylate of linear, primary 12-14 carbon number alcohol (C12-14H25-29)-O—(CH2CH$_2$O) 7H (one of which is sold under the tradename LAE 24-7), twelve mole ethoxylate of linear, primary 12-14 carbon number alcohol (C12-14H25-29)-O—(CH2$CH_2$O) 12H (one of which is sold under the tradename LAE 24-12), and the like.

Additional examples of commercially available nonionic surfactants include: lauryl alcohol ethoxylated with 3 moles of ethylene oxide (EO), coco alcohol ethoxylated with 3 moles EO, stearyl alcohol ethoxylated with 5 moles EO, mixed C12-C15 alcohol ethoxylated with 7 moles EO, mixed secondary C11-C15 alcohol ethoxylated with 7 moles EO, mixed C9-C11 linear alcohol ethoxylated with 6 moles EO and the like. In preferred embodiment the non-ionic has from 8 to 15 carbon atoms in the alkyl group. When this alkyl group is used a nonionic is the mixed C12-C15 alcohol ethoxylated with 7 moles EO. In further embodiment it comprises the alcohol alkoxylates, particularly the alcohol ethoxylates and propoxylates, especially the mixed ethoxylates and propoxylates, particularly with 3-7 oxyethylene (EO) units and 3-7 oxypropylene (PO) units. In other embodiments it comprises the alcohol alkoxylates, particularly C12-C15 alcohol, particularly with 3-20 oxyethylene (EO) units, preferably with 5-12 oxyethylene (EO) units, further preferred with 5-10 oxyethylene (EO) units, in particular with 7 or 8 oxyethylene (EO) units, such as the Lutensol TO available from BASF.

In an embodiment, higher ethoxylated alcohols are included in the detergent composition, particularly linear and/or branched alcohols, preferably containing 8 to 18 carbon atoms, and 3 to 40 ethylene oxide groups (3-40EO), preferably 6 to 30 ethylene oxide groups (6-30EO), further preferred 7 to 20 ethylene oxide groups (7-20EO), more preferred 8 to 10 ethylene oxide groups (8-10EO), and most preferred 8 ethylene oxide groups (8EO), or may contain a mixture. The alcohol radical may be linear, branched, or may contain a mixture. Particularly preferred ethoxylated alcohols are alcohol ethoxylates with linear or branched radicals of alcohols with 12 to 18 carbon atoms, e.g. from coco-, palm-, tallow- or oleyl alcohol, containing 8 to 18 carbon atoms, and 3 to 40 ethylene oxide groups (3-40EO), preferably 6 to 30 ethylene oxide groups (6-30EO), further preferred 7 to 20 ethylene oxide groups (7-20EO), more preferred 8 to 10 ethylene oxide groups (8-10EO), and most preferred 8 ethylene oxide groups (8EO), or may contain a mixture. An exemplary preferred nonionic surfactant is isotridecyl alcohol with 6EO to 14EO, preferably 7EO to 10EO, and most preferred 9EO, or may contain a mixture thereof.

Suitable alkoxylated surfactants for use as surfactants further include a guerbet alcohol ethoxylates, such as those available under the trade names Lutensol XP or M from BASF. The guerbet reaction is a self-condensation of alcohols by which alcohols having branched alkyl chains are produced. The reaction sequence is related to the Aldol condensation and occurs at high temperatures under catalytic conditions. The product is a branched alcohol with twice the molecular weight of the reactant minus a mole of water. The reaction proceeds by a number of sequential reaction steps. At first the alcohol is oxidised to an aldehyde. Then Aldol condensation takes place after proton extraction. Thereafter the aldol product is dehydrated and the hydrogenation of the allylic aldehyde takes place. These products are called guerbet alcohols and are further reacted to the non-ionic alkoxylated guerbet alcohols by alkoxylation with i.e. ethylene oxide or propylene oxide.

In some embodiments, nonionic surfactants are included in the detergent compositions at an amount of at least about 1 wt-% to about 70 wt-%, about 10 wt-% to about 70 wt-%, about 10 wt-% to about 50 wt-%, or about 20 wt-% to about 50 wt-%.

Additional Functional Ingredients

The components of the detergent composition can further be combined with various functional components suitable for uses disclosed herein, including laundry detergents. In some embodiments, the alkaline detergent compositions including the alkalinity, rheology modifiers, water and surfactants make up a large amount, or even substantially all of the total weight of the detergent compositions. For example, in some embodiments few or no additional functional ingredients are disposed therein.

In other embodiments, additional functional ingredients may be included in the detergent compositions. The functional ingredients provide desired properties and functionalities to the compositions. For the purpose of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in cleaning. However, other embodiments may include functional ingredients for use in other applications.

In some embodiments, the detergent compositions may include optical brighteners, defoaming agents, soil antiredeposition agents, bleaching agents, solubility modifiers, dispersants, metal protecting agents, stabilizing agents, corrosion inhibitors, builders/sequestrants/chelating agents, enzymes, aesthetic enhancing agents including fragrances and/or dyes, additional rheology and/or solubility modifiers or thickeners, hydrotropes or couplers, buffers, solvents, additional cleaning agents and the like.

These additional ingredients can be pre-formulated with the detergent compositions or added to the use solution before, after, or substantially simultaneously with the addition of the compositions. Additionally, the compositions can be used in conjunction with one or more conventional cleaning and/or bleaching agents.

According to embodiments of the invention, the various additional functional ingredients may be provided in a composition in the amount from about 0 wt-% and about 90 wt-%, from about 0 wt-% and about 75 wt-%, from about 0 wt-% and about 50 wt-%, from about 0.01 wt-% and about 50 wt-%, from about 0.1 wt-% and about 50 wt-%, from about 1 wt-% and about 50 wt-%, from about 1 wt-% and about 30 wt-%, from about 1 wt-% and about 25 wt-%, or from about 1 wt-% and about 20 wt-%. In addition, without being limited according to the invention, all ranges recited are inclusive of the numbers defining the range and include each integer within the defined range.

Hydrotropes

In a preferred embodiment, a hydrotrope is included in the detergent composition. Any suitable hydrotrope may be used. In an aspect, the hydrotrope is a C1-C10 alcohol or a glycol. Exemplary C1-C10 alcohols include for example methanol, ethanol, propanol, isopropanol, decanol, benzyl alcohol and derivatives thereof. Exemplary glycols include for example, ethylene glycol, propylene glycol, hexylene glycol, 3-butanediol, 1,4-butanediol, 2-ethy-1,3,-hexanediol, 2-methyl-2-propyl-1,3-propanediol, glycerol ethyl hexyl glyceryl ether, and the like, or combinations thereof.

Various other hydrotropes can be employed according of the liquid compositions disclosed here.

In exemplary embodiments, a hydrotrope is included in the detergent compositions in an amount from about 0.1 wt-% and about 10 wt-%, from about 1 wt-% and about 10 wt-%, from about 1 wt-% and about 8 wt-%, or from about 2 wt-% and about 8 wt-%.

Chelating/Sequestering Agents

In a preferred embodiment, a chelant/sequestrant/builder is included in the detergent composition. An exemplary class includes aminocarboxylates or aminocarboxylic acid type sequestrants including the acids or alkali metal salts thereof, e.g., amino acetates and salts thereof. Suitable aminocarboxylates include N-hydroxyethylaminodiacetic acid; hydroxyethylenediaminetetraacetic acid, nitrilotriacetic acid (NTA); ethylenediaminetetraacetic acid (EDTA); N-hydroxyethyl-ethylenediaminetriacetic acid (HEDTA); diethylenetriaminepenta-acetic acid (DTPA); ethylenediaminetetraproprionic acid triethylenetetraaminehexaacetic acid (TTHA), and alanine-N,N-diacetic acid; glutamic acid, N,N-diacetic acid (GLDA), methylglycinediacetic acid (MGDA), iminodisuccinate (IDS) and the like, and the respective alkali metal, ammonium and substituted ammonium salts thereof, and mixtures thereof. Suitable commercially available MGDAs include but are not limited to Trilon M available from BASF. Biobased amino-carboxylates, such as GLDA, may also be used.

Other suitable chelating/sequestering agent(s) include water soluble polycarboxylate polymers. Such homopolymeric and copolymeric chelating/sequestering agent(s) include polymeric compositions with pendant (—CO2H) carboxylic acid groups and include polyacrylic acid, polymethacrylic acid, polymaleic acid, acrylic acid-methacrylic acid copolymers, acrylic-maleic copolymers, hydrolyzed polyacrylamide, hydrolyzed methacrylamide, hydrolyzed acrylamide-methacrylamide copolymers, hydrolyzed polyacrylonitrile, hydrolyzed polymethacrylonitrile, hydrolyzed acrylonitrile methacrylonitrile copolymers, polymaleic acid, polyfumaric acid, copolymers of acrylic and itaconic acid, phosphino polycarboxylate, acid or salt forms thereof, or mixtures thereof. Water soluble salts or partial salts of these polymers or copolymers such as their respective alkali metal (for example, sodium or potassium) or ammonium salts can also be used. The weight average molecular weight of the polymers is from about 4000 to about 90,000. An example of commercially available polycarboxylic acids (polycarboxylates) is ACUSOL 445 which is a homopolymer of acrylic acid with an average molecular weight of 4500 (Dow Chemicals). ACUSOL 445 is available as partially neutralized, liquid detergent polymer. Sokalan CP 5 is an acrylic acid/maleic acid copolymer available from BASF with a mean molar mass of 70000 g/mol.

Aminophosphonates are also suitable for use as chelating/sequestering agent(s) and include ethylenediaminetetramethylene phosphonates, nitrilotrismethylene phosphonates, and diethylenetriamine-(pentamethylene phosphonate) for example. These aminophosphonates commonly contain alkyl or alkenyl groups with less than 8 carbon atoms. These can also include phosphonic acid or phosphonate salt. Suitable phosphonic acids and phosphonate salts include 1-hydroxy ethylidene-1,1-diphosphonic acid (HEDP); ethylenediamine tetrakis methylenephosphonic acid (EDTMP); diethylenetriamine pentakis methylenephosphonic acid (DETPMP); cyclohexane-1,2-tetramethylene phosphonic acid; amino[tri(methylene phosphonic acid)]; (ethylene diamine[tetra methylene-phosphonic acid)]; 2-phosphono butane-1,2,4-tricarboxylic acid; or salts thereof, such as the alkali metal salts, ammonium salts, or alkylol amine salts, such as mono, di, or tetra-ethanolamine salts; picolinic, dipicolinic acid or mixtures thereof.

In exemplary embodiments, a chelant/sequestrant is included in the detergent compositions in an amount from about 0 wt-% and about 25 wt-%, from about 0.1 wt-% and about 20 wt-%, from about 0.1 wt-% and about 10 wt-%, from about 1 wt-% and about 8 wt-%, from about 2 wt-% and about 8 wt-%, or from about 3 wt-% and about 8 wt-%.

In exemplary embodiments, a combination of chelants/sequestrants is included in the detergent compositions in an amount from about 0.1 wt-% and about 25 wt-%, from about 0.1 wt-% and about 20 wt-%, or from about 0.1 wt-% and about 10 wt-%. In further exemplary embodiments, a combination of aminocarboxylate and polycarboxylate polymer chelants/sequestrants are provided in the amount from about 0.1 wt-% and about 25 wt-%, from about 0.1 wt-% and about 20 wt-%, or from about 0.1 wt-% and about 10 wt-%.

Optical Brighteners

Optical brighteners can also be included in the detergent compositions. Optical brighteners are also referred to as a fluorescent whitening agent or a fluorescent brightening agent. Brighteners are added to laundry detergents to replace whitening agents removed during washing and to make the clothes appear cleaner. Optical brighteners may include dyes that absorb light in the ultraviolet and violet region (usually 340-370 nm) of the electromagnetic spectrum, and re-emit light in the blue region (typically 420-470 nm). These additives are often used to enhance the appearance of the color of a fabric, causing a perceived "whitening" effect, making materials look less yellow by increasing the overall amount of blue light reflected. In some embodiments, optical brighteners are included in the compositions at an amount of from about 0.1 to about 5 wt-%, from about 0.15 to about 3 wt-%, or from about 0.2 to about 2 wt-%.

Examples of suitable optical brighteners are commercially available and will be appreciated by those skilled in the art, including derivatives of stilbene, pyrazoline, carboxylic acid, methinecyanines, dibenzothiophene-5,5-dioxide, azoles, 5- and 6-membered-ring heterocycles, and other miscellaneous agents. Examples of suitable commercially available optical brightening agents include those sold under the tradename Tinopal, available from BASF. Examples of optical brighteners are also disclosed in "The Production and Application of Fluorescent Brightening Agents", M. Zahradnik, Published by John Wiley & Sons, New York (1982), and U.S. Pat. No. 9,752,109, which are herein incorporated by reference in their entirety.

Aesthetic enhancing agents such as colorants and perfume are also optionally incorporated into the detergent compositions. Examples of perfumes or fragrances useful in the acidic cleaning compositions include but are not limited to liquid fragrances.

It should be understood that the water provided as part of the solution or concentrate of the detergent composition can be relatively free of hardness. It is expected that the water can be deionized to remove a majority of the dissolved solids in the water. The concentrate is then diluted with water available at the locale or site of dilution and that water may contain varying levels of hardness depending upon the locale. Although softened or deionized is preferred for formulating the concentrate, the concentrate can be formulated with water that has not been deionized. That is, the concentrate can be formulated with water that includes dissolved solids, and can be formulated with water that can be characterized as hard water.

Methods of Making

Beneficially, the detergent compositions can be made by simple liquid batch mixing processes. As a further benefit, the batch mixing process does not include a premix, milling step and/or homogenizer for the formulation. Still further, the formulations of the detergent compositions are able to overcome peak viscosities that would require additional energy input and/or changes in processing machinery as a result of batch mixing processes that introduce to the batch both the rheology modifiers (e.g. HASE/ASE polymers) and surfactants before the alkalinity source. As demonstrated herein, the stability of the detergent composition is impacted by the ability of the surfactants to interact with the rheology modifiers before the alkalinity is added to the batch mixing process. Following such process provides stable detergent compositions are provided, such that the emulsions are stable.

The stable compositions are an opaque emulsion, wherein the liquid composition is stable for at least 6 months at ambient temperatures (or as measured under accelerated stability conditions of 50 C for 8 weeks), and wherein stability is measured according to phase separation of less than 5%. Beneficially, the stable emulsions do not or only slightly undergo phase separation during storage or when exposed to highly different temperature ranges.

Methods of Use

The detergent compositions are suited for various applications of use. Laundry detergents are a particularly preferred application of use for the compositions. However, additional cleaning applications, can be employed where there is a need for a rheology modifier package to provide built detergent formulations containing nonionic surfactants and alkalinity sources and/or builders. For example, detergent compositions for hard surface cleaning, membrane cleaning, paper processing and/or water treatment, and various laundry applications can be employed. It is desirable for the detergent compositions to be uniformly dispensed using conventional dispensing, such as pumps, due to the rheology modifier package employed.

The detergent compositions can be applied to surfaces using a variety of methods. These methods can operate on an object, surface, or the like, by contacting the object or surface with the detergent composition. Contacting can comprise any of numerous methods for applying a viscous liquid, such as pumping the composition for further use and/or dilution of a concentrate, immersing the object in the composition, foam or gel treating the object with the composition, or a combination thereof. Without being limited to the contacting according to the invention, a concentrate or use liquid composition can be applied to or brought into contact with an object by any conventional method or apparatus for applying a viscous liquid composition to an object. For example, the surface can be wiped with, sprayed with, foamed on, and/or immersed in the liquid compositions, or use liquid compositions made from the concentrated liquid compositions. The liquid compositions can be sprayed, foamed, or wiped onto a surface; the compound can be caused to flow over the surface, or the surface can be dipped into the compound. Contacting can be manual or by machine.

The detergent compositions are in contact with a surface or object for a sufficient amount of time to clean the surface or object. In an aspect, the surface or object is contacted with the detergent composition for at least about 1 minute, or at least about 10 minutes. The detergent compositions can be applied at a use or concentrate solution to a surface or object in need of cleaning.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The following ingredients are utilized in the Examples:

Acusol 830 (28%)—ASE—Acrylic alkali swellable emulsion copolymer, 2-Propenoic acid, 2-methyl-, polymer with ethyl 2-propenoate Acusol 805S (28%)—HASE—hydrophobically-modified acrylic based alkali swellable emulsion Acusol 820 (30%)—HASE—Associative anionic acrylic hydrophobically modified alkali swellable emulsion Glucopon 625 UP (50%)—C12-16 Alkyl polyglucoside nonionic thickening surfactant Polyacrylate—Acrylic polymer (4500 MW)

Linear Alcohol Ethoxylate—nonionic LAE surfactant, C12-14, 7EO

Branched Alcohol Ethoxylate—nonionic alcohol ethoxylate, isotridecyl alcohol, 9EO Chelating agent—Methylglycinediacetic acid Example 1

The ranges of the ASE and HASE polymers and surfactants shown in Table 2 were evaluated to provide a desired final product viscosity between about 500 cPs to about 2500 cPs for the liquid product.

TABLE 2

| Component | Evaluated Range (wt-%) |
|---|---|
| Rheology Modifiers | 5 |
| Acusol 805S (HASE 1) | 0-3 |
| Acusol 820 (HASE 2) | 0-3 |
| Acusol 830 (ASE) | 1-5 |
| APG surfactant | 0-0.5 |
| Water | 49.8-50.3 |
| Optical brightener | 0.2 |
| Chelating agent | 2 |
| Polyacrylate | 2.5 |
| Alcohol ethoxylate surfactant(s) | 25 |
| NaOH (50%) | 15 |

Figure 2:
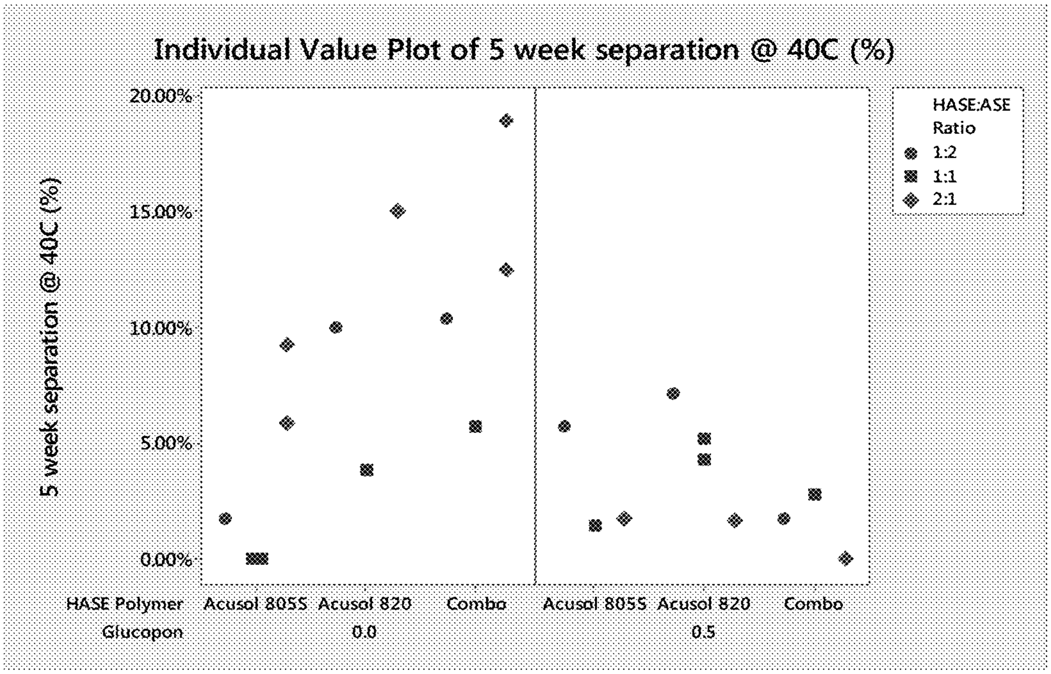

The following variations of polymers outlined in Table 3 were evaluated and the results are included in Table 3 and depicted in FIGS. 1-2.

TABLE 3

| Run # | Acusol 830-ASE | Acusol 805S - HASE 1 | Acusol 820-HASE 2 | Glucopon | HASE: ASE Ratio | 5 week separation @ RT (%) | 5 week separation @ 40 C (%) | 5 week separation @ 50 C (%) | 5 week viscosity @ RT (50 rpm Cps) |
|---|---|---|---|---|---|---|---|---|---|
| 22 | 3.34 | 1.66 | | 0.5 | 1:2 | 0.00% | 5.71% | 0.00% | 670 |
| 11 | 2.5 | 2.5 | | 0.5 | 1:1 | 1.72% | 1.45% | 3.08% | 1486 |
| 5 | 1.66 | 3.34 | | 0.5 | 2:1 | 0.00% | 1.69% | 1.85% | 1488 |
| 21 | 3.34 | 1.66 | | | 1:2 | 0.00% | 1.72% | 10.00% | 870 |
| 3 | 2.5 | 2.5 | | | 1:1 | 0.00% | 0.00% | 3.39% | 810 |
| 14 | 2.5 | 2.5 | | | 1:1 | 0.00% | 0.00% | 1.39% | 754 |
| 2 | 1.66 | 3.34 | | | 2:1 | 4.48% | 5.88% | 6.25% | 2588 |
| 6 | 1.66 | 3.34 | | | 2:1 | 10.14% | 9.23% | 22.58% | 1626 |
| 8 | 3.34 | | 1.66 | 0.5 | 1:2 | 4.92% | 7.14% | 3.33% | 1102 |
| 18 | 2.5 | | 2.5 | 0.5 | 1:1 | 1.67% | 5.17% | 3.45% | 1676 |
| 13 | 2.5 | | 2.5 | 0.5 | 1:1 | 1.41% | 4.29% | 2.70% | 1780 |
| 1 | 1.66 | | 3.34 | 0.5 | 2:1 | 1.72% | 1.67% | 1.47% | 2776 |
| 10 | 3.34 | | 1.66 | | 1:2 | 4.62% | 10.00% | 4.48% | 1808 |
| 25 | 2.5 | | 2.5 | | 1:1 | 2.22% | 3.85% | 3.33% | 1430 |
| 24 | 1.66 | | 3.34 | | 2:1 | 11.32% | 82.46% | 8.70% | 5688 |
| 4 | 3.34 | 0.83 | 0.83 | 0.5 | 1:2 | 0.82% | 1.72% | 1.82% | 1056 |
| 7 | 2.5 | 1.25 | 1.25 | 0.5 | 1:1 | 1.85% | 2.78% | 3.17% | 1260 |
| 15 | 1.66 | 1.67 | 1.67 | 0.5 | 2:1 | 0.00% | 0.00% | 1.43% | 2288 |
| 16 | 3.34 | 0.83 | 0.83 | | 1:2 | 0.00% | 10.39% | 24.00% | 878 |
| 9 | 2.5 | 1.25 | 1.25 | | 1:1 | 4.41% | 5.71% | 2.86% | 1262 |
| 12 | 1.66 | 1.67 | 1.67 | | 2:1 | 8.57% | 18.92% | 5.63% | 4120 |
| 20 | 1.66 | 1.67 | 1.67 | | 2:1 | 5.08% | 12.50% | 2.86% | 1756 |

The formulations were evaluated for viscosity, stability and separation of the formulation. Viscosity was determined by QATM 084 using the Glass Jar Stability Test as follows:

Samples were allocated to multiple glass jars/vials and placed in storage at room temperature, 40° C. and 50° C. At different time points, stability was evaluated by evaluating appearance (color, visible separation, other observations) and measuring % separation, if any. % separation was determined by measuring the height of the separated layer (typically an opaque layer at the bottom) and the height of the overall sample. The formula for calculating is show:

% Separation=height of bottom layer (mm)/height of sample (mm)*100%

The % separation was measured at 1 week, 5 weeks, and 9 weeks for each sample at the different storage conditions. As shown on the y-axis of the FIGS. 1-2, as the percentage separation increases there is a less stable emulsion.

The results show that when the nonionic alkyl polyglycoside surfactant Glucopon is included in the formulations there is greater ability to increase the amount and ratio of HASE to ASE polymer. As shown, the presence of the Glucopon increased stability of the 2:1 HASE:ASE formulations, whereas formulations without the Glucopon showed best stability with a 1:1 HASE:ASE formulation. As show in Table 3, viscosity generally increases as the HASE:ASE ratio increases. This demonstrates a further preference for formulations having all three rheology polymers and mixtures of greater concentrations of HASE:ASE polymers to further include the Glucopon.

Results having a percentage of separation of less than about 5%, and preferably form about 0% to about 2% are preferred formulations.

Example 2

The mixing order of the key components is shown to impact the stability and viscosity of the formulation. This was demonstrated by preparing batches with the same chemical composition (Table 4), but with the key components added in different mix orders. The key components were divided into rheology modifiers, nonionic surfactants, and sodium hydroxide. The batches were made using 6 different mix orders, and of those mix orders, the product was only stable when both the rheology modifiers (e.g. HASE/ASE polymers) and surfactants were added to the batch before the NaOH alkalinity. This indicates the stability is impacted by the ability of the surfactants to interact with the rheology modifiers before the alkalinity is added.

TABLE 4

| Component | % |
|---|---|
| Water | 39 |
| Rheology Modifiers | 5 |
| Alcohol Ethoxylate Surfactant(s) | 26 |
| Sodium Hydroxide (50%) | 30 |

TABLE 5

| Component Mix Order | Observations |
|---|---|
| Rheology Modifiers/ Surfactants/NaOH | Mixed well, stable final product |
| Rheology Modifiers/ NaOH/Surfactants | Mixed well, final product showed significant separation within a day |
| NaOH/Rheology Modifiers/Surfactants | Polymer chunks formed during mixing, significant separation observed within 1 day |
| NaOH/Surfactants/ Rheology Modifiers | Polymer chunks formed during mixing, significant separation observed within 1 day |
| Surfactants/NaOH/ Rheology Modifiers | Mixed well, final product showed significant separation within a day |
| Surfactants/Rheology Modifiers/NaOH | Mixed well, stable final product |

Example 3

A hydrotrope can be added to the formulations containing ASE and HASE polymer blends in order to reach a desired final product viscosity between about 500 cPs to about 2500 cPs for the liquid product. The range of viscosity beneficially allows the products to be pourable and pumpable which are desired for various applications of use. In one example (Table 6), addition of hexylene glycol to the formulation resulted in a higher final product viscosity. Further, the addition of hexylene glycol also resulted in a lower peak viscosity during mixing which better facilitates manufacturing. The viscosity measurements are shown in Table 7.

TABLE 6

| Raw Material Description | Formula A | Formula B |
|---|---|---|
| Water | 42.8 | 37.8 |
| Hexylene Glycol | — | 5 |
| HASE/ASE Rheology Modifier Blend | 5 | 5 |
| Alcohol Ethoxylate Surfactant(s) | 26 | 26 |
| Sodium Hydroxide | 15 | 15 |
| Other | 11.2 | 11.2 |

TABLE 7

| Formulation | A | B |
|---|---|---|
| Peak in-process viscosity | 4480 Cp | 3280 Cp |
| Final viscosity (ambient storage) | 1140 Cp | 2316 Cp |

The viscosity was measured at each material addition and after a final 90:00 mix. Viscosities were measured using a Brookfield RVT, spindle #3 at 50 rpm. As shown in Table 6 the inclusion of the hydrotrope has a significant impact on viscosity of the final liquid product and at the peak viscosity measurement. The use of the ASE/HASE 1:1 ratio of polymers in the formulation result in a more desired viscosity with the use of the hexylene glycol hydrotrope. In an embodiment, the addition of the hexylene glycol (or other hydrotropes, e.g. dipropylene glycol) prior to the addition of the caustic beneficially provides a lower viscosity in the peak mixing phase and results in a more stable product.

It is to be understood that while the invention has been described in conjunction with the detailed description thereof, the foregoing description is intended to illustrate, and not limit the scope of the invention, which is defined by the scope of the appended claims. Other embodiments, advantages, and modifications are within the scope of the following claims. In addition, the contents of all patent publications discussed supra are incorporated in their entirety by this reference.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A method of washing textiles comprising:

providing a liquid detergent composition comprising:

a) between about 25 wt-% and about 40 wt-% alkalinity comprising alkali metal hydroxide;

b) between about 4 wt-% and about 7 wt-% rheology modifiers comprising:

i) a C12-C16 alkyl polyglycoside nonionic surfactant, ii) at least one alkali-swellable polymer (ASE) according to the following formula:

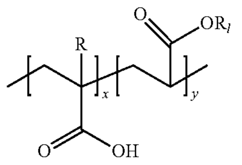

wherein R is hydrogen or a C1 to C6 alkyl chain; R1 is hydrogen or a C1 to C6 alkyl chain and wherein the ratio of x:y is from 1:10 to 10:1, iii) at least one hydrophobically-modified alkali-swellable polymer (HASE) according to the following formula:

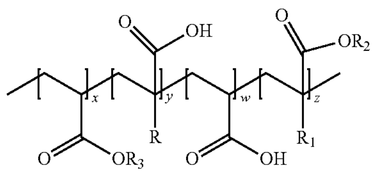

wherein R is a hydrogen or C1-C6 alkyl group;

wherein R1 is a hydrogen or C1-C6 alkyl group;

wherein R2 is a hydrophobic alkyl group in the range from C4-C24;

wherein R3 can be any one of a hydrogen or C1-C6 alkyl group;

wherein the ratio of x:y is from about 1:20 to about 20:1;

wherein the ratio of x:w is from about 1:20 to about 20:1; and wherein the ratio of x:z is from about 1:1 to about 500:1, wherein the ASE rheology modifier has a molecular weight between about 20,000 to about 300,000 g/mol, and wherein the HASE rheology modifier has a molecular weight between about 50,000 to about 500,000 g/mol, and wherein the ratio of the HASE rheology modifier to the ASE rheology modifier is from about 1.1:1 to about 4.5:1;

c) between about 15 wt-% to about 35 wt-% ethoxylated alcohol nonionic surfactant(s);

d) between about 15 wt-% to about 40 wt-% water; and e) optionally at least one of a chelant, sequestrant or builder; and contacting a textile with the liquid detergent composition.

2. The method of claim 1, further comprising diluting the liquid detergent composition at a point of use with water.

3. The method of claim 1, wherein the contacting is in an institutional washing machine.

4. The method of claim 1, wherein the contacting is in a household washing machine.

5. The method of claim 1, further comprising adding a bleaching composition to the liquid detergent composition.

6. The method of claim 1, wherein the contacting is for at least about 1 minute.

7. The method of claim 1, wherein the contacting is for at least about 10 minutes.

8. The method of claim 1, wherein the contacting comprises at least one selected from the group consisting of dipping, wiping, spraying, foaming, immersing, gel treating, and flowing over the textile with the detergent.

9. The method of claim 1, wherein the rheology modifiers are included at an actives level between about 0.5% to about 5%.

10. The method of claim 1, wherein the rheology modifier comprises from about 0.01 wt-% to about 5 wt-% of the nonionic alkyl polyglycoside surfactant.

11. The method of claim 1, wherein the a chelant, sequestrant or builder comprises an aminocarboxylate, polycarboxylate polymer or mixtures thereof.

12. The method of claim 1, wherein one of the ethoxylated alcohol nonionic surfactants is a linear or branched alcohol containing 8 to 18 carbon atoms, and 7 to 20 ethylene oxide groups.

13. The method of claim 1, wherein the detergent composition further comprises a hydrotrope and wherein the composition has a viscosity between about 500 to about 2500 cPs.

* * * * *